United States Patent [19]

Lind et al.

[11] Patent Number: 4,779,151
[45] Date of Patent: Oct. 18, 1988

[54] ROBOTIC TAPE CASSETTE HANDLING SYSTEM WITH ROTARY LOADING AND UNLOADING MECHANISM

[75] Inventors: Jeffrey S. Lind, Stanton; Timothy L. Crabtree, Anaheim, both of Calif.

[73] Assignee: Odetics, Inc., Anaheim, Calif.

[21] Appl. No.: 761,059

[22] Filed: Jul. 31, 1985

Related U.S. Application Data

[63] Continuation-in-part of Ser. No. 720,577, Apr. 8, 1985, abandoned, and a continuation-in-part of Ser. No. 720,591, Apr. 8, 1985, Pat. No. 4,654,727.

[51] Int. Cl.⁴ .......................... G11B 15/68; B65G 1/00
[52] U.S. Cl. ......................................... 360/92; 360/69; 360/137; 414/280; 414/276
[58] Field of Search ........................... 360/92, 137, 69; 369/38, 39; 414/416, 280, 276, 277; 221/13

[56] References Cited

U.S. PATENT DOCUMENTS

| | | |
|---|---|---|
| 3,525,086 | 8/1970 | Lichowsky ................. 360/92 X |
| 3,831,197 | 8/1974 | Beach et al. ............... 360/92 X |
| 3,938,190 | 2/1976 | Semmlow et al. ............ 360/92 |
| 3,964,577 | 6/1976 | Bengtsson ................. 414/280 X |
| 4,251,177 | 2/1981 | Neuhaeusser et al. ........ 414/276 |
| 4,287,541 | 9/1981 | Tanahashi et al. ........... 360/92 |
| 4,471,394 | 9/1984 | Hapke ..................... 360/92 |

FOREIGN PATENT DOCUMENTS

| | | | |
|---|---|---|---|
| 0137305 | 10/1979 | Japan | 360/92 |
| 0157156 | 12/1980 | Japan | 360/92 |

*Primary Examiner*—Robert S. Tupper
*Assistant Examiner*—Andrew L. Sniezek
*Attorney, Agent, or Firm*—Spensley Horn Jubas & Lubitz

[57] ABSTRACT

An automated tape cassette sequencing system includes a cassette storage library containing a plurality of columns of storage bins facing an interior space within which a cassette manipulator is located. The manipulator moves cassettes between the storage bins and tape transport units which also face the interior space. Rotary loading and unloading mechanisms are provided in openings in the housing of the library and include one or more storage bins. The mechanisms are rotatable from a first position in which the storage bins face outwardly through the openings to a second position in which the storage bins face the interior space of the library. Cassettes can be loaded and unloaded by an operator while the mechanisms are in their first position and handled by the manipulator assembly while the mechanisms are in their second position.

14 Claims, 2 Drawing Sheets

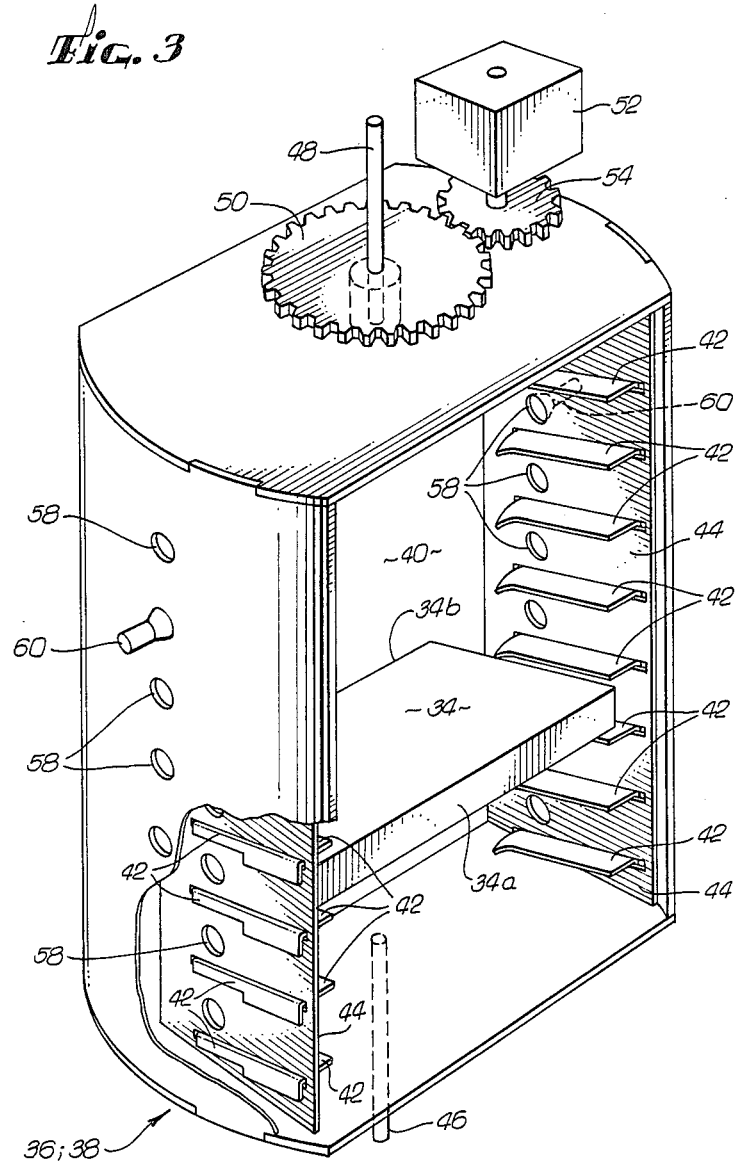

ROBOTIC TAPE CASSETTE HANDLING SYSTEM WITH ROTARY LOADING AND UNLOADING MECHANISM

CROSS REFERENCE TO RELATED APPLICATION

This application is a continuation-in-part of application Ser. No. 720,577, filed Apr. 8, 1985, abandoned, and entitled Robotic Materials Handling System and a continuation-in-part of application Ser. No. 720,591, filed Apr. 8, 1985, now U.S. Pat. No. 4,654,727, entitled Videocassette Sequencing and Handling System.

BACKGROUND OF THE INVENTION

1. Field of the Invention

The present invention relates to a robotic materials handling system for storing and handling box-like articles. More particularly, the present invention relates to robotic system for rapidly and reliably handling videocassettes in an automated cassette sequencing system. Still more particularly, the present invention relates to a rotary loading and unloading mechanisms intended to simplify the loading and unloading of cassettes into a cassette storage library.

2. Description of the Prior Art

In most prior art sequencing systems, cartridges containing videotape are held on a carousel which is moved to position the desired cartridge at a tape transport unit for loading. Such systems are relatively complex and expensive to maintain.

A recently developed system incorporates a stationary column of storage bins for holding cassettes and an automatic elevator system that loads designated cassettes into specific transports at the time required. The capacity of the system is limited to forty video cassettes. Although this system provides several advantages over earlier systems, it is limited in its ability to adequately store and handle a large number of videocassettes.

SUMMARY OF THE INVENTION

The present invention is directed to a robotics materials handling system for storing and handling box-like articles such as videocassettes in applications where speed and reliability are critical. The invention provides a storage area containing a plurality of columns of storage bins, and an article manipulator coupled to a shaft located adjacent the storage area. The storage bins are contained within a housing and tape cassettes carried within the housing have their rear, or label, edge facing the article manipulator. The manipulator grasps the cassettes to move them to desired locations. In order to facilitate the loading and unloading of cassettes into and from the storage bins in the storage area, rotary loading and unloading mechanisms are secured to the housing. The mechanism includes a number of storage bins which are exposed through an opening in the housing when in a first rotational orientation. Cassettes are loaded into the storage bins of the loading mechanism in a fashion similar to the normal loading of a cassette into a tape transport, i.e., by grasping the rear edge of the cassette. The mechanism is then rotated 180° to position the cassettes to face toward the manipulator. The manipulator then removes the cassettes and loads them into the storage bins in the storage area or directly into cassette tape transport mechanisms. Cassettes are removed from the system by reversing the aforementioned steps. The loading and unloading mechanisms make it very easy to remove and insert cassettes and easy to read the cassette labels even after they have been loaded into the storage bins of the mechanisms.

BRIEF DESCRIPTION OF THE DRAWINGS

The invention will be described with reference to the accompanying drawings, wherein:

FIG. 3 is a perspective view, partially broken away, of the rotary cassette loading or unloading mechanism of the present invention.

DESCRIPTION OF THE PREFERRED EMBODIMENT

The following description is of the best presently contemplated mode of carrying out the invention. This description is made for the purposese of illustrating the general principles of the invention, and is not to be taken in a limiting sense. The scope of the invention is best determined by reference to the appended claims.

Figure 1:
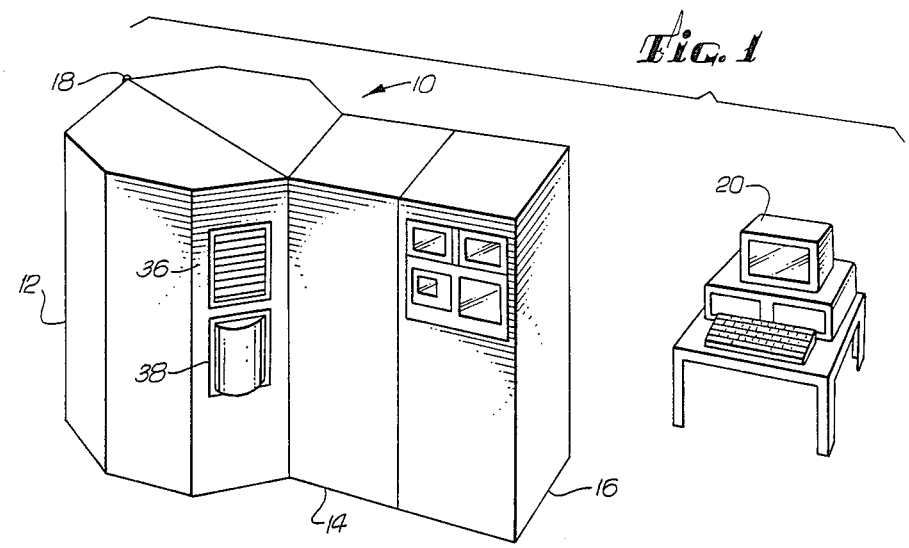
FIG. 1 is a perspective view of the cassette handling system of the present invention.

Referring to FIG. 1, a videocassette sequencing system is comprised of a main housing 10 including an octagonal library portion 12, a video tape transport and electronic section 14 and a monitoring section 16. The library section is hinged at 18 so as to allow access to its interior for servicing. The library section is configured to store approximately 300 videocassettes. The electronic section 14 includes a plurality of video cassette transports and associated electronics. The operation of the system is controlled by means of a computer 20 which includes a control keyboard and monitor.

Figure 2:
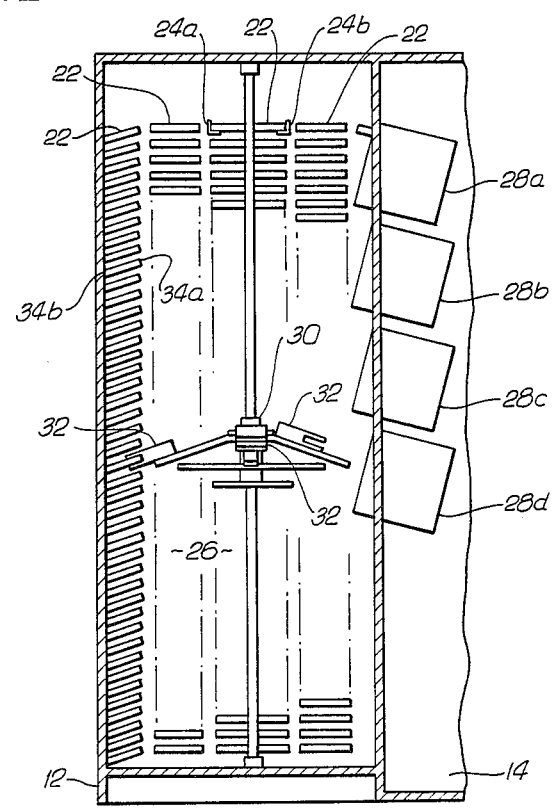
FIG. 2 is a sectional view of the storage library and cassette manipulator of the present invention.

Referring to FIG. 2, the library portion 12 includes seven columns 22 of cassette storage bins, four columns of which are visible in FIG. 2. Each storage bin is slightly inclined so as to aid in the retention of videocassettes. Each bin is formed of side L-shaped sections 24a and 24b. In the present embodiment of the invention, each column includes forty-three individual storage bins, with the library 12 thus containing a total of 301 storage bins. The columns 22 are arranged in a circular fashion, with one column being located on each of seven sides of the octagonal housing. The columns thus surround a central space 26.

A column of four tape transports 28a–d is located on the eighth side of the library housing. The transports 28 are substantially the same distance from the axial center of the space 26 as are the storage bins 22. The transports 28 and associated electronics may be playback only, or may be record/playback to facilitate dubbing of videocassettes.

A manipulator assembly 30 is contained within the central space 26. The manipulator includes four cassette gripper mechanisms 32 (three of which are visible in FIG. 2). The manipulator is operable to move cassettes between the storage bins 22 and transport mechanisms. The specific operation of the sequencing system and manipulator 30 is described in detail in previously mentioned copending application Ser. Nos. 720,577 and 720,591, both filed Apr. 8, 1985, the disclosures of which are incorporated herein by reference.

A typical videocassette has a tape opening at its front edge and rear edge which may include a label. The cassettes are loaded into the transport mechanisms with the front edge first. In order to facilitate proper loading of the transports, therefore, the cassettes are stored in the storage bins with their rear edge facing the central space 26 and their front edge facing the outside of the housing. This is indicated in FIG. 2 for a cassette 34, with the rear edge being designated 34a and the front edge containing the tape opening being designated 34b.

The cassettes are loaded into the removed from the library 12 by means of rotary loading and the unloading mechanisms 36 and 38, respectively. The mechanisms are exposed through access openings in one wall of the housing (FIG. 1). As can be seen in FIG. 3, the loading and the unloading mechanisms are box-like objects having a closed rear wall 40 and an open front section. L-shaped brackets 42 are secured to the side walls 44 and define a plurality of storage bins (eight in the disclosed embodiment) in the loading and the unloading mechanisms. The elements 42 are slanted downwardly from the front to the rear to maintain cassettes at substantially the same angle as the remaining bins in the storage library. The rotary loading and the unloading mechanisms 36 and 38 are rotationally coupled to bearings (not shown) in the library housing by means of rods 46 and 48 extending from the top and bottom of the mechanism, respectively. A drive gear 50 is secured to the rod 48 and is driven by a motor 52 to selectively rotate the loading and unloading mechanisms. The motor 52 is secured to the housing by means of a bracket (not shown). A gear 54 is connected to the drive shaft of the motor and meshes with the gear 50.

The loading and unloading operation will now be described. The loading of all the storage bins 22 of the library is accomplished by loading cassettes into the mechanism 36 and subsequently employing the cassette manipulator 30 to transfer cassettes to the storage bins 22. FIG. 1 shows the loading mechanism 36 oriented so that it opens to the outside of the housing. In this orientation, cassettes may be inserted into the bins defined by the brackets 42. As indicated in FIG. 3, a cassette is inserted into the loading mechanism in a conventional fashion, i.e., with the exposed tape edge 34b being inserted first and the label edge 34a facing outward. Thus, the label edge 34a is visible after insertion of a cassette into the loading mechanism. This loading method is similar to the conventional method of loading a videocassette into a tape transport mechanism, and is very convenient for the operator. Once the desired number of cassettes have been loaded into the mechanism, the motor 52 is driven to rotate the mechanism by 180°. At this point, the rear edges of the cassettes face inwardly toward the central space 26, in the same fashion as cassettes in the columns of bins 22. The manipulator mechanism 30 is activated to grasp cassettes from the mechanism 36 and deliver them to selected bins 22. The gripper mechanisms 32 grasp the cassettes from the rear and place them into the bins in the same orientation as they had in the loading mechanism. In some instances, the manipulator may be controlled to directly load a cassette from the loading mechanism into a transport mechanism. In either case, the orientation of a cassette is not changed during its movement in that the rear edge continues to face toward the central space 26.

Cassettes to be removed from the library are delivered by the manipulator 30 to the unloading mechanism 38. This mechanism is shown in FIG. 1 in its closed orientation, i.e., its opening faces the central space 26. Once the unloading mechanism has been filled, it is rotated by 180° to expose the cassettes therein through the opening in the housing. The operator may then remove the cassettes from the loading mechanism and return them to a main storage library.

Holes 58 are formed in each side of the loading and the unloading mechanisms 36 and 38 to accommodate optical sensors 60 which are mounted within the housing of the library 12. These sensors are provided to determine the presence or absence of cassettes in each of the storage bins in the loading mechanisms. By sensing the presence of cassettes, the loading an unloading operations may be automated in various manners. For example, the outputs of the sensors may be provided to automatic control circuitry to automatically rotate the loading or unloading mechanism by 180° whenever it is full. Similarly, even if the loading or unloading mechanism is not full, it may be rotated and the proper bins accessed in response to the sensing of cassettes. Furthermore, the system may be configured so that a selected cassette may be removed by giving a single command to the system which causes the machine to remove the cassette from its storage bin and place it into the unloading mechanism and subsequently cause the unloading mechanism to automatically rotate by 180°.

By providing the loading and unloading mechanisms as illustrated, cassettes can be inserted into and removed from the system in a convenient manner. The slanted storage bins enables cassettes to be inserted down into the mechanism, making it very easy to remove or insert a cassette. In addition, labels on the rear edge of the cassettes can be read after insertion of the cassettes into the mechanism. The provision of the loading and unloading mechanisms avoids the need to obtain direct access to the storage bins of the library by opening the housing. This provides substantial benefits since access by an operator to the storage bins is greatly limited by the presence of the cassette manipulator mechanism.

What is claimed is:

1. A tape cassette handling system for handling tape cassettes having a front edge with a tape opening and a rear edge opposite the front edge comprising:

a housing including a cassette library containing a plurality of columns of storage bins within the housing each having an opening facing an interior space, said storage bins for supporting cassettes with their rear edge facing the interior space, said housing further including a loading opening;

at least one tape transport;

a cassette loading means rotatably mounted within the library adjacent the loading opening for facilitating addition of cassettes to the cassette library, the loading means having one or more storage bins each having an opening, wherein the loading means is rotatable from a first position in which said opening of at least one storage bin of the loading means is oriented to face the loading opening thereby to facilitate manual loading of cassettes in at least one storage bin of the loading means with the rear edge of the cassettes facing the loading opening, to a second position in which the opening of at least one storage bin of the loading means is oriented to face the interior space; and a cassette manipulator means located within the interior space for grasping cassettes and selectively moving them between the loading means, storage bins of the library and the tape transport.

2. A handling system as in claim 1 wherein the loading means comprises a box-like casing having an open front and a plurality of storage bins formed within the casing and supporting cassettes with their rear edge facing outward from the open front.

3. A handling system as in claim 2 wherein the storage bins of the loading means each include a plurality of shelves and wherein each shelf is slanted to support the rear edge of a cassette higher than the front edge.

4. A handling system as in claim 2 further including means for rotating the loading means.

5. A handling system as in claim 4 wherein the means for rotating includes a motor drive system.

6. A handling system as in claim 5 including sensor means for detecting when a cassette is in a storage bin of the loading means.

7. A handling system as in claim 1 further including a second opening in the housing and an unloading means for facilitating removal of cassettes from the system.

8. For use in a tape cassette handling system having a library housing containing a storage libary having a loading opening for receiving cassettes to be loaded to the storage library and a plurality of columns of storage bins in the library housing for supporting cassettes with a front edge of each cassette having a tape opening so that the front edge faces the outside of the library housing and away from an interior space within the library housing, a tape transport and a cassette manipulator carried within the interior space for grasping and moving cassettes,
 a loading housing rotatably carried within the library housing adjacent the loading opening, said loading housing having at least one storage bin having an opening and being rotatable from a first position in which the opening of the storage bin of the loading housing faces the loading opening to a second position in which the opening of the storage bin faces the interior space such that the storage bin of the loading housing is accessible by the cassette manipulator, wherein the cassette manipulator selectively moves cassettes between the storage bins of the library, the tape transport and the storage bin of the loading housing in its second position.

9. A tape cassette handling system comprising:
a plurality of tape transports;
a housing including a cassette storage library having a plurality of storage bins and at least one cassette access opening for receiving cassettes to be moved to the storage bins or to the tape transports, or for receiving cassettes to be removed from the library or from the tape transports;
a rotary means rotatably mounted within the library adjacent the access opening for providing access to the storage library, the rotary means having one or more holding bins each having an opening for receiving a cassette, wherein the rotary means is rotatable from a first position in which the opening of at least one holding bin is accessible from outside of the housing to a second position in which the opening of at least one holding bin is accessible from inside of the housing; and
cassette manipulator means located within the housing for selectively moving cassettes between the rotary means, said storage bins and said tape transports.

10. A handling system as in claim 9, wherein the rotary means comprises a box-like casing having a plurality of holding bins each defined by a plurality of shelves, wherein eah shelf is tilted downward from the opening of the holding bin.

11. A handling system as in claim 10 further comprising means for rotating the rotary means.

12. A handling system as in claim 11 further including sensor means for detecting whether a cassette is in a holding bin of the rotary means.

13. A handling system as in claim 9 wherein the housing includes two access openings each having a rotary means, wherein one rotary means is dedicated to receiving cassettes to be added to the system and the other rotary means is dedicated to receiving cassettes to be removed from the system.

14. A handling system for box-like articles comprising:
a housing including a storage library having a plurality of stationary storage bins and at least one access opening for receiving articles to be stored in storage bins and for receiving articles to be removed from the library;
a rotary means rotatably mounted within the library adjacent the access opening for providing access to the libary, the rotary means having one or more holding bins each having an opening for receiving an article, wherein the rotary means is rotatable from a first position in which the opening of at least one holding bin is accessible from the outside of the housing, to a second position in which the opening of at least one holding bin is accessible from inside of the housing; and
manipulator means located within the housing for selectively moving articles between the rotary means and said stationary storage bins.

* * * * *